United States Patent
Krimmer et al.

(10) Patent No.: US 6,901,942 B2
(45) Date of Patent: Jun. 7, 2005

(54) BUTTERFLY VALVE WITH INJECTION-MOLDED SHAFT

(75) Inventors: Erwin Krimmer, Pluederhausen (DE); Peter Baur, Waiblingen (DE); Christian Lorenz, Aalen-Unterrombach (DE); Bruno Hezel, Stuttgart (DE); Hubert Hickl, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/458,238

(22) Filed: Jun. 11, 2003

(65) Prior Publication Data

US 2004/0031945 A1 Feb. 19, 2004

(30) Foreign Application Priority Data

Jun. 14, 2002 (DE) .......................... 102 26 594

(51) Int. Cl.[7] .............. B21D 51/16; B21K 1/20
(52) U.S. Cl. .............. 137/15.25; 29/890.127; 137/315.22; 251/305
(58) Field of Search .......... 29/890.12, 890.126, 29/890.127; 137/15.25, 315.22, 315.24; 251/305, 308, 368, 239, 249, 259; 264/239, 249, 259

(56) References Cited

U.S. PATENT DOCUMENTS

| | | | | |
|---|---|---|---|---|
| 2,586,927 A | * | 2/1952 | Fantz | 251/306 |
| 3,318,567 A | * | 5/1967 | Gifford | 251/306 |
| 3,537,164 A | * | 11/1970 | Williams | 29/890.12 |
| 3,750,698 A | * | 8/1973 | Walchle et al. | 251/305 |
| 3,804,366 A | * | 4/1974 | Rubright | 251/305 |
| 4,038,734 A | * | 8/1977 | Goldman | 251/305 |
| 4,243,203 A | * | 1/1981 | Mack | 251/305 |
| 4,786,031 A | * | 11/1988 | Waldrop | 251/368 |
| 5,177,866 A | * | 1/1993 | Bennett et al. | 29/890.127 |
| 5,275,375 A | * | 1/1994 | Semence | 251/308 |
| 5,503,544 A | * | 4/1996 | Platusich | 425/116 |
| 5,531,248 A | * | 7/1996 | Pearson et al. | 251/305 |
| 5,666,988 A | * | 9/1997 | Becker | 251/308 |
| 6,354,267 B1 | * | 3/2002 | Kotchi et al. | 123/337 |
| 6,598,854 B1 | * | 7/2003 | Jessberger et al. | 251/305 |

* cited by examiner

Primary Examiner—Paul J. Hirsch
(74) Attorney, Agent, or Firm—Ronald E. Greigg

(57) ABSTRACT

The invention relates to a method for producing a throttle valve unit for installation into a flow conduit through which a gas flow passes. A flap shaft of the throttle valve unit is affixed to a stamped insert part inside a fastening region. The stamped insert part, which includes an insert border, is molded into a housing. At the same time as the stamped insert part is molded into the housing, the flap shaft affixed to the stamped insert part is molded-in inside the fastening region. A planar region of the stamped insert part connected to the flap shaft is cut out from this stamped insert part.

16 Claims, 4 Drawing Sheets

BUTTERFLY VALVE WITH INJECTION-MOLDED SHAFT

BACKGROUND OF THE INVENTION

1. Field of the Invention

In internal combustion engines, throttle valves are used in the intake section and can be used to regulate the air volume that the internal combustion engine requires to combust the fuel. As a rule, the throttle valve includes a drive unit, the throttle valve supported on a shaft, and a throttle housing, which can be embodied as a cast metal part or as injection-molded plastic part. The throttle housing is often also provided with a separate housing cover, which can seal the housing to prevent outside air from being sucked into the valve.

2. Description of the Prior Art

The subject of DE 43 29 522 A1 is a throttle device that is built into the intake conduit of an internal combustion engine. The throttle device is comprised of a housing, a throttle valve control unit, a position detector, and a throttle valve supported on a throttle shaft; the throttle device is disposed between the clean air side air filter connection and the intake unit of the internal combustion engine. The air filter connection and/or the intake unit are made of a plastic; the individual elements of the throttle device are modularly designed and are attached to one another by means of plugged, screwed, or clamped connections. The throttle valve shaft is comprised of two parts. One shaft half of the throttle valve shaft can be provided with the module for the position sensor and the other shaft half can be provided with the module for the throttle valve actuating unit. The actuating unit, position sensor, throttle valve, and throttle valve shaft constitute a common component.

The subject of WO 95/2493 A1 is a molded article made of plastic, in particular produced by means of the injection molding process, and throttle valve housing with a wall whose inner wall surface borders a cavity. The wall contains an insert part that is covered by the plastic material, at least on the inner wall surface oriented toward the cavity. The insert part is inclined in relation to the normal plane in such a way that when a pivoting throttle valve, which is contained in the cavity and is used to control the output of an internal combustion engine, is disposed in its idle position, the insert part extends flush with it. The insert part can be made of metallic material, for example sheet metal.

DE 197 03 296 A1 has disclosed a method for sealing a throttle valve shaft, which supports a throttle valve, and a throttle valve connector. In a throttle valve connector for an internal combustion engine of a motor vehicle, a throttle valve shaft that passes through a recess in the throttle valve connector is sealed by a hardening sealant. The sealant prevents air from flowing through a manufacture-induced gap between the throttle valve shaft and the recesses.

EP 0 575 235 B1 relates to a rotating throttle mechanism for fuel injection systems of internal combustion engines. A shaft with cylindrical seats is provided, which has a segment for accommodating a throttle valve, which segment has a uniform, rotationally asymmetrical cross section that is greater than the cross section of the portion of the shaft to one side of the segment. The throttle valve has a central bore whose cross section corresponds to that of the segment. The shaft as a whole is comprised of plastic and is cast of one piece with a cam to be slung or wound around by a control cable that is disposed on the other side of the above-mentioned segment, the throttle valve itself being comprised of plastic, preferably a thermoplastic plastic. The segment of the throttle valve shaft is cylindrical, with parallel flattened zones. The throttle valve has a flattened hub with a central bore, which in cross section is the shape of a circle that is flattened parallel to the wings of the throttle valve.

DE 199 15 695 A1 relates to an intake element made of plastic and a method for producing it. A throttle body includes an inner main section made of plastic, a secondary section made of plastic, which is embodied as integral with an outer circumference of the main section, and an icing prevention tube, which is embedded in the secondary section. The cylindrically embodied main section with an essentially uniform wall thickness is produced in a first molding step in which shrinkage and distortion are suppressed in order to obtain the required roundness or circularity of an inner circumference surface of the main section. The secondary section is produced in a subsequent, second molding step so that an outside of the main section is covered in order to thus produce a throttle body. The temperature of one section of the mold oriented toward the inner circumference surface of the main section is set lower than the temperature of the other section of the mold. As a result, the inner circumference surface of the main section in which dimensional precision must be maintained is cooled earlier than the other section in order to effectively prevent shrinkage. If different types of plastic materials are used to mold the main section and the secondary section, this increases the degree of freedom in the selection of materials.

OBJECT AND SUMMARY OF THE INVENTION

The embodiment proposed according to the invention has the advantage over the prior art that it produces a throttle valve, which is injection molded into a throttle valve housing made of plastic or aluminum without a costly machining of individual parts. The flap part can be embodied as an essentially flat stamped part with a perforated border and after being molded-in, this stamped part is cut free by means of laser cutting so that it can execute its flap function, i.e. the pivoting. The perforated border of the flap part includes individual bores or openings, which are penetrated by the plastic that is still fluid during the injection molding process so that the stamped part functioning as the flap part is anchored in the plastic housing. The stamped part can advantageously include an embossed zone that represents a weak point along which laser cutting, for example executed in the housing, can separate the perforated border from the flap part, which will later be pivotable.

A shaft containing lateral bores is inserted into the stamped part and is encompassed on its circumference side by individual bracket-shaped sections of the stamped part surface. This shaft made of metallic material that can be hardened, which is inserted into the stamped part, is encompassed by the plastic material during the molding-in of the stamped part, which plastic material in the fluid state penetrates into openings provided on the shaft made of hardened metallic material, which openings can for example be designed as lateral bores, thus eliminating the need to provide a slit in the shaft for the subsequent installation of a flap element. The molding-in of the stamped part with a shaft preinstalled in bracket-shaped regions eliminates the need for a costly machining of individual parts since an attachment between the stamped part and the shaft occurs as a result of molding the stamped part into the plastic material. During the molding-in of the stamped part with the preinstalled shaft, the fluid plastic penetrates into lateral bores in the shaft made of hardened metallic material, thus producing a frictionally and positively engaging connection between the metallic components, i.e. the shaft made of hardened material, the stamped part, and the plastic material in which they are molded-in.

BRIEF DESCRIPTION OF THE DRAWINGS

The invention will be better understood and further objects and advantages thereof will become more apparent from the ensuing detailed description of preferred embodiments taken in conjunction with the drawings, in which:

FIG. 5 shows a perspective top view of the housing into which the stamped insert part is molded-in.

DESCRIPTION OF THE PREFERRED EMBODIMENTS

Figure 1:
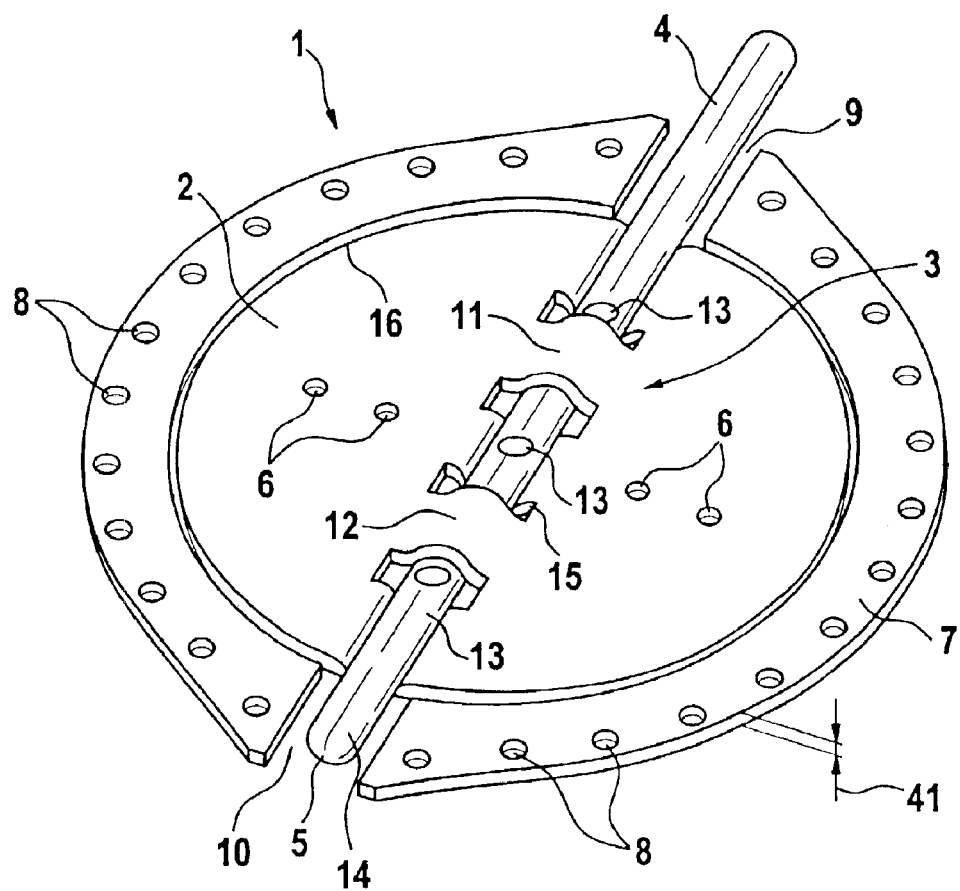
FIG. 1 shows a flap shaft with lateral bores preinstalled in a stamped insert part according to the invention.

FIG. 1 shows a preinstalled stamped insert part with a perforated border, with bracket-shaped punched parts that fix a flap shaft in place. A stamped insert part 1 made of a thin metallic material includes a flap surface 2 whose circumference is encompassed by an insert border 7. The insert border 7 contains a multitude of openings 8, which can be embodied for example as bores, or as punched perforations.

An insert shaft 4 is affixed in place in the flap surface 2. To this end, two conical sections 11, 12 are provided in the planar surface 2, which are raised so that they protrude up in the plane of the drawing according to FIG. 1, and an additional, third bracket-like formation 15 that points downward in the plane of the drawing is provided between the first bracket-like formation 11 and the inwardly protruding second bracket-like formation 12. The brackets 11, 12, and 15 enclose the circumference surface 14 of the flap shaft 4 so that this shaft is positioned with a rounded end 5 disposed in a second recess 10 of an insert border 7. The end of the flap shaft 4 opposite from the rounded end 5 of the flap shaft 4 passes through a first recess 9 of the insert border 7 that serves to fix the stamped insert part in place. An actuating drive unit not shown in FIG. 1, which is embodied for example as an electric motor, is provided at the end opposite from the rounded end 5 of the flap shaft 4, and can pivot the flap shaft 4 and the flap surface 2 affixed to it about its longitudinal axis.

In a fastening region 3 inside of which the brackets 11, 12, and 15 are disposed next to and yet spaced apart from one another, the flap shaft 4 contains lateral openings 13, which can be embodied for example as lateral bores. The lateral openings 13 of the flap shaft 4 are preferably embodied passing all of the way through so that a plastic material with which the fastening region 3 between the flap shaft 4 and the flap surface 2 is being molded-in can flow through the lateral openings 13 and a durable, positively and frictionally engaging connection is produced between the flap shaft 4 and the flap surface 2 after they have been molded-in with the plastic material.

Figure 3:
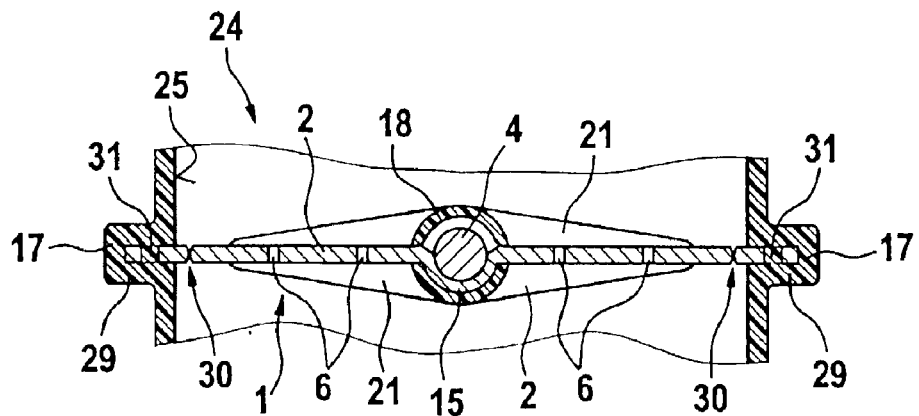
FIG. 3 shows a cross section through the stamped insert part according to FIG. 2 contained in the material of the housing, the sectional view passing through the plane of the ribbing.

In addition, perpendicular to the flap shaft 4, the flap surface 2 of the stamped insert part 1 is provided with openings 6, which extend through the flap surface 2 and are also penetrated by the plastic during the molding of the stamped insert part 1 in the fastening region 3 and which are used to affix a reinforcing ribbing to the top and bottom of the planar region 2 (see FIG. 3).

The stamped insert part 1 shown in FIG. 1 is embodied with a material thickness 41 of a few mm, e.g. between 1 and 2 mm. The stamped insert part 1 according to FIG. 1 can contain a weakened zone 16 extending in the form of a ring between the planar region 2 and the insert border 7 encompassing it. This circularly extending weakened zone 16, embodied for example in the form of an embossed area, is used for cutting out the planar region 2, for example by means of a laser cutting, in order to make the planar region 2 pivotable, after the insert border 7 is embedded in a plastic or aluminum housing. The weakened zone 16 can be provided on both the top and the bottom of the stamped insert part so that a laser cutting operation need only cut through a minimal material thickness, which considerably improves the achievable manufacturing precision.

Figure 2:
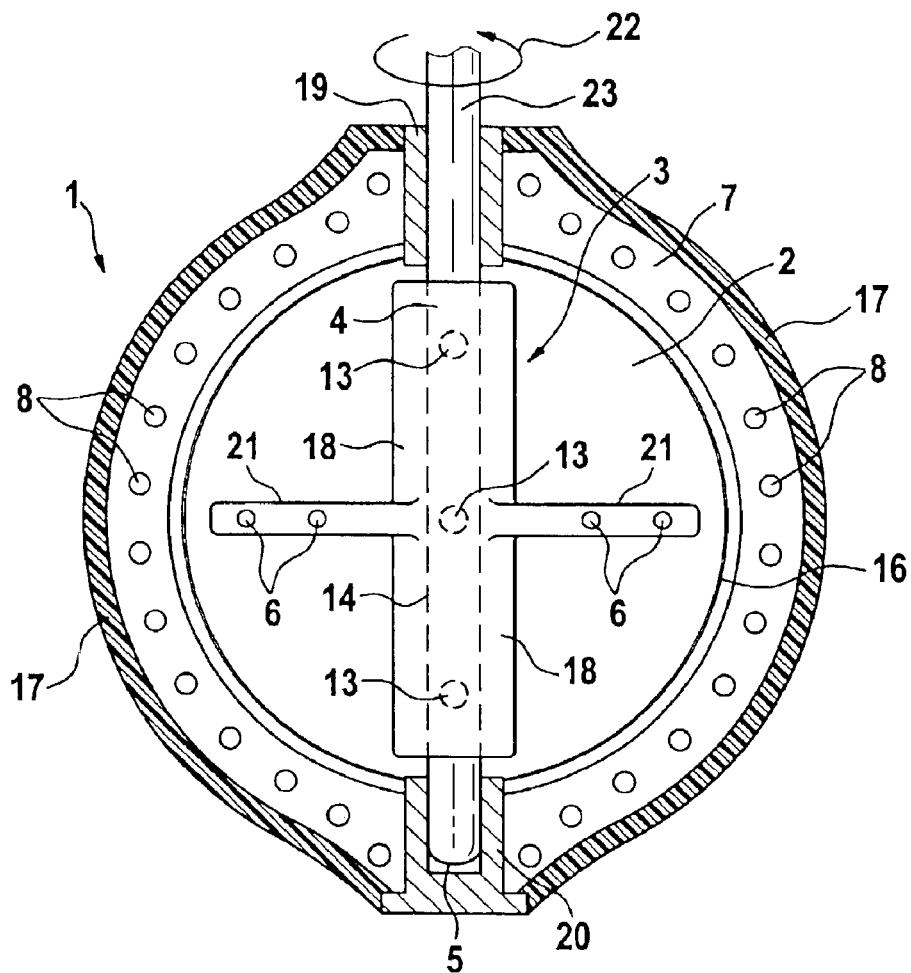
FIG. 2 shows the stamped insert part injection molded into a housing, with a molded-in flap shaft and a ribbing of the flap surface.

FIG. 2 shows the stamped insert part molded into a housing, the molded-in flap shaft, and the ribbing of the flap. The top view according to FIG. 2 shows that the flap shaft 4 preinstalled in the stamped insert part 1 is provided with a first bearing bush 19 and a second bearing bush 20 in the vicinity of its opposed ends, which is for connection to an actuating drive unit not shown here. The bearing bushes 19 and 20 are snugly fitted into the recesses 9 and 10 of the insert border 7 shown in FIG. 1 and are preferably press-fitted onto the insert shaft 4.

In the vicinity of its insert border 7, which is provided with a number of openings 8, the stamped insert part 1 shown in FIG. 2 is molded into the housing material 17. When the housing material 17 is being injected into a plastic injection mold with a stamped insert part 1 positioned in it, the fluid plastic passes through the individual openings 8, which can be embodied for example as holes or slots, or can be of some other geometry, and thus fixes the stamped insert part 1 in place in the housing material 17. At the same time as the stamped insert part is molded into the housing material, the fastening region 3, in which the flap shaft 4 is attached to the stamped insert part 1, is molded-in. In this region, plastic material 18 is injected into the injection mold not shown in FIG. 2 in such a way that plastic material penetrates the lateral bores 13 provided in the flap shaft 4, which pass all of the way through the flap shaft 4, thus producing a positively engaging connection between the plastic material 18 and the flap shaft 4 in the fastening region 3. At the same time as the plastic material 18 is being molded around the flap shaft 4, reinforcing ribs 21 are produced, which are embodied on a top side or on the top and bottom of the planar region 2 of the stamped insert part 1, which planar region 2 will later be cut out. The plastic material that forms the ribs 21 on the planar region 2 of the stamped insert part 1 penetrates the planar region 2—i.e. the flap surface of the throttle valve unit that will later be cut along the weakened zone 16—thus reinforcing the planar region 2, i.e. the flap surface of the throttle valve unit, in the radial direction. As shown in FIG. 3, the reinforcing ribs 21 can be formed simultaneously onto the top and bottom of the planar region 2, i.e. the flap surface of the stamped insert part 1.

The penetration of the plastic material 18 into the openings 13 of the flap shaft 4, which are embodied for example as lateral bores, produces a positively and frictionally engaging connection, so that after the planar region 2 of the stamped insert part 1 that serves as the flap surface is cut out using the laser cutting method and the flap shaft 4 is rotated, it is possible to pivot the planar region 2 that serves as the flap surface, wherein the flap shaft 4, which is secured to the stamped insert part 1 by means of bracket-like punched parts 11, 12, 15 (see FIG. 1), is accommodated in pivoting fashion in the first bearing bush 19 and second bearing bush 20 inside the housing comprised of the housing material 17. The press-fitting of the first bearing bush 19 and the second bearing bush 20 onto the flap shaft 4 occurs as soon as the stamped insert part 1 has been molded into the housing material 17 and the fastening region 3 joining of the flap shaft 4 to the stamped insert part 1 has also been molded into the plastic material 18. The first bearing bush 19 and the second bearing bush 20 are then press-fitted onto the rounded end 5 of the flap shaft 4 and onto the flap shaft end that can be connected to an actuating drive unit 23 that is not shown in FIG. 2. The arrow identified with the reference numeral 22 indicates the rotation direction exerted on the flap shaft 4 by an actuating drive unit connected to the connecting point 23 of the flap shaft 4.

FIG. 3 shows a sectional depiction of the stamped insert part according to FIG. 2 embedded in the housing material, the section extending in the plane of the ribbing. The housing material 17 encompassing the stamped insert part 1 can, for example, be that of a flow conduit 24 through which a gas flow passes, for example a fuel/air mixture or an air flow in the intake section of an internal combustion engine. The flow cross section is defined by an inner conduit wall 25 of the flow conduit 24. The sectional depiction according to FIG. 3 shows that the stamped insert part 1 that contains the planar region 2 is enclosed by plastic material 17 on both sides along its insert border 7, the openings 8 in the insert border 7 being penetrated by intermediary pieces 31 of housing material 17 that fix the stamped insert part 1 in place in the flow conduit 24 shown in FIG. 3. The reference numeral 30 indicates the zone embodied on one or both sides of the stamped insert part 1 in which the planar region 2 inside the flow conduit 24 is cut out from the stamped insert part 1, for example by means of laser cutting. The planar region 2 that is cut out from the stamped insert part 1 by this cutting operation serves as a pivoting throttle valve, which can be used to regulate a gas flow passing through the flow conduit 24. The sectional view according to FIG. 3 shows that a rib 21 is disposed on the top and bottom of the planar region 2 of the stamped insert part 1. The rib 21 is produced at the same time as the flap shaft 4 is being molded in place; the plastic material 18 penetrates the openings 6 disposed in the planar region 2, perpendicular to the course of the flap shaft 4, thus producing a positively engaging connection between the planar region 2 of the stamped insert part 1 and the plastic material 18. FIG. 3 also shows that a bracket-like punched part 15 in the stamped insert part 1 is completely molded-in by the plastic material 18, which also passes through the openings 13, not shown in FIG. 3, passing all the way through the flap shaft 4.

The molding of the insert border 7 of the stamped insert part 1 into the housing material 17 achieves a precisely positioned mounting 29 of the stamped insert part 1 in a housing, which can be easily produced from a production engineering standpoint.

Figure 4:
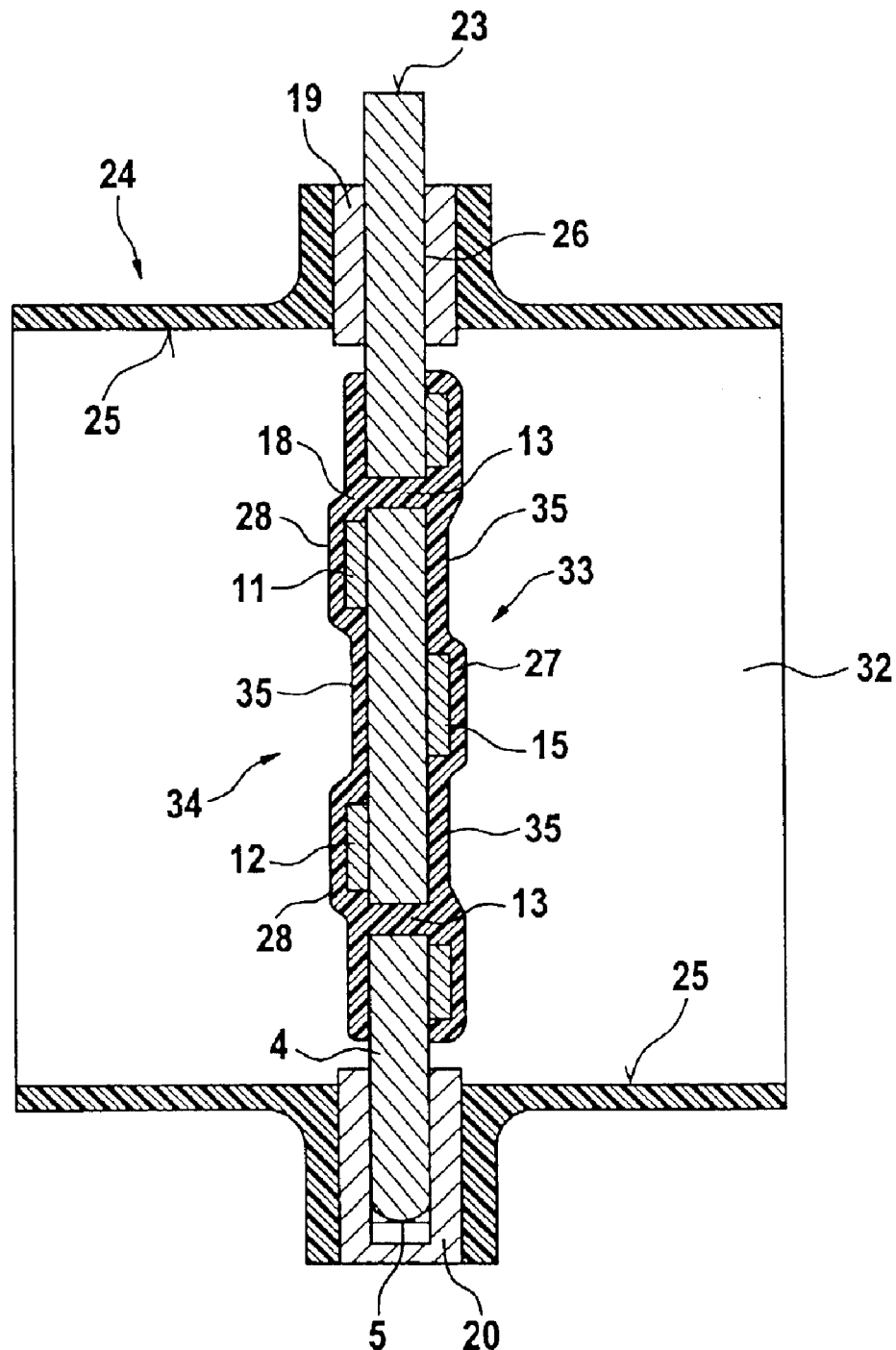
FIG. 4 shows the stamped insert part according to FIG. 2 contained in the housing material, with a longitudinal section through the flap shaft molded into the plastic material.

FIG. 4 shows the stamped insert part 1 according to FIG. 2 embedded in the housing material, with a longitudinal section through the flap shaft molded into the plastic material. It is clear from this view that the flap shaft 4 of the stamped insert part 1 is supported in a first bearing bush 19 and a second bearing bush 20 in the wall of a flow conduit 24. The first bearing bush 19 and the second bearing bush 20 can contain gap seals 26. The reference numeral 23 indicates the end of the flap shaft 4 by means of which a pivoting motion can be imparted to this shaft by an actuating drive unit that is not shown in FIG. 4, e.g. an electric motor.

Molding the flap shaft 4, whose circumference surface 14 is partially encompassed by bracket-like punched parts 11, 12, and 15 on the stamped insert part 1, in plastic material 18 produces intermediary pieces of plastic in the vicinity of the openings 13 passing all of the way through the flap shaft 4, which reliably attach the flap shaft 4 and the cut-out planar region 2 of the stamped insert part 1 to each other. The sectional depiction in FIG. 4 shows that the uppermost of the openings 13 is disposed next to the first bracket-like punched part 11 of the stamped insert part, while the lowermost opening 13 of the flap shaft 4 is disposed next to the second bracket-like punched part 12. Since the two bracket-like punched parts 11 and 12 are disposed spaced apart from each other, when the bracket-like punched parts 11 and 12 are molded into the plastic material 18, a bulge labeled with the reference numeral 28 is produced in the vicinity of the molding around the flap shaft 4. The first bracket-like punched part 11 and the second bracket-like punched part 12 are disposed on the second side of the stamped insert part 1, while a third bracket-like punched part 15 between them is disposed on the opposite side, i.e. the first side 33 of the stamped insert part 1. In lieu of the three bracket-like punched parts shown here, four or five bracket-like punched parts can also be provided, depending on the flow cross section 32 of the flow conduit 24 in which the stamped insert part 1 is to be fixed.

When the middle, third bracket-like punched part 15 in the stamped insert part 1 is molded into place, this produces a bulge 27 of the plastic material 18 on the first side 33 of the stamped insert part 1. On the opposite side from the bulges 27 and 28 on the first side 33 or second side 34 of the stamped insert part 1, on their respective reverse sides, there are flat spots 35 since the flap shaft, in the vicinity of the flat spots 35, is not encompassed by a bracket-like punched part 11, 12, or 15. The bracket-like punched parts 11, 12, and 15 disposed in the axial direction of the flap shaft 4, for example three of which have been raised up from the surface in the depiction according to FIG. 4, are disposed spaced apart from each other so that when the fastening region 3 between the flap shaft 4 and the stamped insert part 1 are molded into place, plastic flows through the interstices between the bracket-like punched parts 11, 12, and 15, which advantageously encourages the positive engagement between the punched parts 11, 12 of the stamped insert part 1 and the flap shaft 4 that they encompass.

After the fastening region 3 between the flap shaft 4 and the stamped insert part 1 molded into the housing material 17 is also molded-in, the planar region 2 that represents the throttle flap is cut out by means of a cutting process. Particularly favorable results can be achieved through the use of laser cutting in which a weakened zone 16 embodied on one of the sides 33 or 34 or both sides 33, 34 of the stamped insert part 1 is removed by a laser cutting head. This separates the planar region 2 of the stamped insert part 1 affixed to the flap shaft 4 from the insert border 7 molded into the housing material 17. The use of a laser cutting method can produce a highly precise, essentially scratch-free cut so that when the pivotable planar region 2 supported on the flap shaft 4 is in the closed position, a powerful sealing action in the flow conduit 24 can be achieved.

Figure 5:
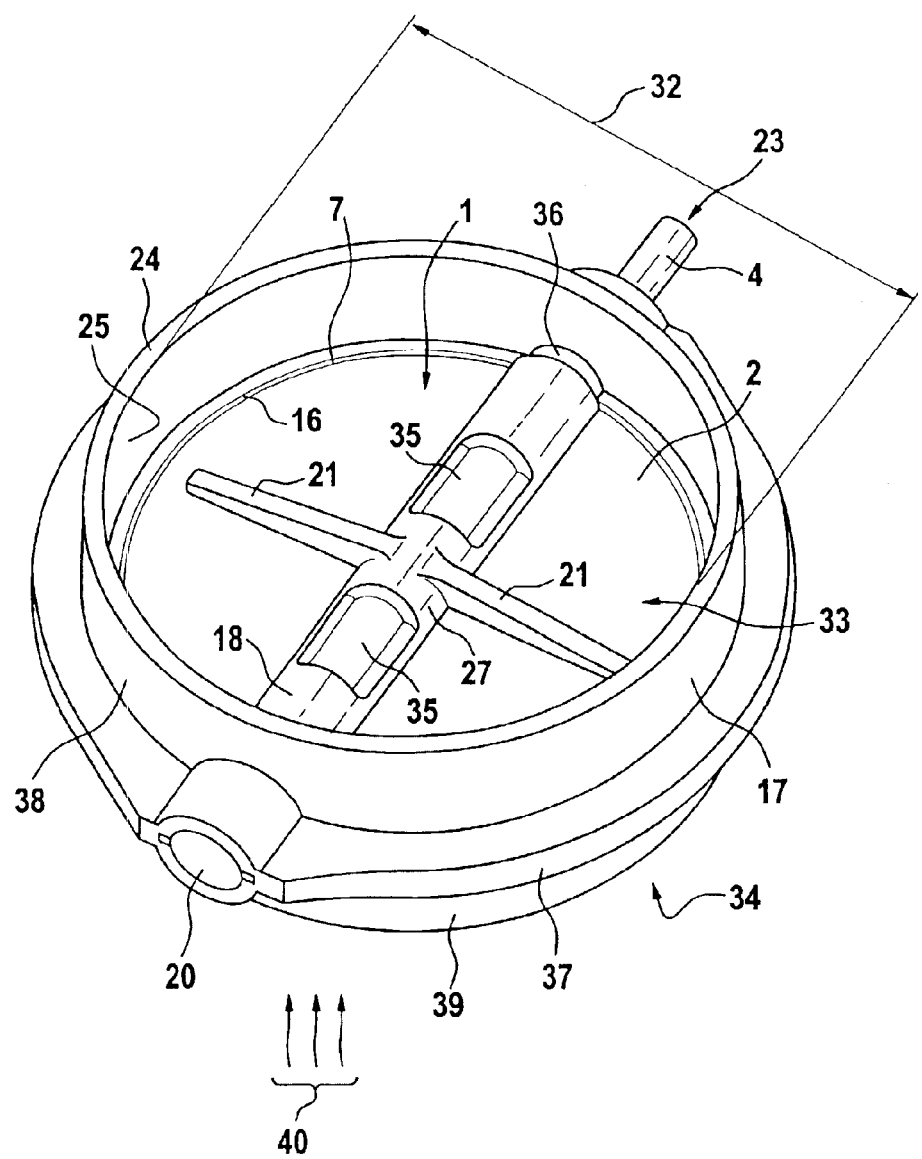

FIG. 5 shows a perspective top view of the housing encompassing the stamped insert part. According to this depiction, the stamped insert part 1 made of a metallic material is enclosed along its insert border 7 by the housing material 17, which is plastic or aluminum. According to the embodiment of a throttle valve or regulating valve unit shown in FIG. 5, a first connecting point 38 and another connecting point 39 are provided, at which conduits for a gaseous medium can be connected to the throttle valve unit produced according to the invention. The gas flow passing through the flow cross section 32 is indicated by the arrows labeled with the reference numeral 40.

After the formation of the housing, i.e. after the stamped insert part 1 is molded into the housing material 17, then the fastening region 3 between the flap shaft 4 and the planar region 2 of the stamped insert part 1 is molded-in. The plastic material 18 encompasses the flap shaft 4 completely, which produces the flat spots 35 and the bulge 27 on the first side 33 of the planar region 2 shown in the sectional view in FIG. 4. Perpendicular to the flap shaft 4 on the first side 33 of the planar region 2, the reinforcing ribs 21 can be seen, which cover over the openings 6 in the planar region 2 that have been penetrated by the plastic material 18.

By means of a rotation prevention device, the second bearing bush 20 is press-fitted into the housing material 17 so that it is affixed to the housing, while the opposite end of the flap shaft (see reference numeral 23) is connected to an actuating drive unit that pivots the planar region 2.

The stamped insert part 1 depicted in a perspective top view in FIG. 5 includes an embossed weakened zone 16 extending in a circle on the first side 33. This zone can also be embodied on the second side 34 of the stamped insert part 1 that is not shown here, or can be disposed on both sides 33, 34 of the stamped insert part 1. The weakened zone 16 divides the planar region 2, which is to be cut out, from the insert border 7, which is mounted in the housing material 17. The material of the planar region 2 is cut out, i.e. separated, from the material of the insert border 7 along the weakened zone 16, which is embodied in the form of a circle here. This enables the flap function of the planar region 2 so that when the actuating drive unit, which can be connected to the connecting point 23, causes the flap shaft 4 to execute a pivoting motion, a partial closing or opening of the flow cross section 32 of the flow conduit 24 can be produced.

In order to reinforce the housing made of housing material 17, it can be provided with an outer flange or collar 37 running along its circumference surface between the first connecting point 38 and the second connecting point 39, into which the rotation prevention device of the second bearing bush 20 can be press-fitted.

The method proposed according to the invention for manufacturing a throttle valve unit makes it possible to eliminate a costly machining of individual parts in regulating or throttle valves, for example of the kind used in the intake section or intercooling section of internal combustion engines. With the manufacturing method proposed according to the invention, it is no longer necessary to have an aluminum housing and flap parts be precisely machined separately nor is it necessary to keep on hand a flap shaft provided with a slot. Housings made of plastic material or die-cast aluminum are currently produced in large lots, which is why the aluminum molding or the plastic molding process is preferably used, each of which uses a mold. The planar region 2 is preferably cut out using the laser cutting process, which yields a high precision in the course of the cut. The provision of openings 13 that extend all of the way through the flap shaft 4 and the provision of openings 6 in the planar region 2 can produce a positively engaging connection between the pivoting planar region 2 and the plastic material 18 in one step. The embodiment of alternatingly oriented bracket-like punched parts 11, 12, and 15 that are spaced apart from one another in the planar region 2 of the stamped insert part 1 permits a simple preassembly of the flap shaft 4 in the stamped insert part 1, where in addition to the openings 13 in the flap shaft 4 and the openings 6 in the planar region 2, the plastic material 18 also flows through the interstices between the bracket-like punched parts 11, 12, and 15. Avoiding the use of the slotted flap shaft 4 that must be separately machined permits the achievement of a positively engaging connection between these components, which assures a transmission of force.

The foregoing relates to preferred exemplary embodiments of the invention, it being understood that other variants and embodiments thereof are possible within the spirit and scope of the invention, the latter being defined by the appended claims.

We claim:

1. A method for producing a throttle valve unit to be installed in a flow conduit (24) through which a gas flow (40) passes, the method comprising:
   a) affixing a flap shaft (4) to a stamped insert part (1) inside a fastening region (3), said stamped insert part (1) including an insert border (7),
   b) molding in an injection molding die a plastic housing (17) onto the insert border (7) of the stamped insert part (1),
   c) molding a plastic material around the flap shaft (4) at the same time as the housing (17) is molded onto the insert border (7) of the stamped insert part (1) by injecting plastic material about at least a portion of the flap shaft (4), and
   d) cutting out a planar region (2) of the stamped insert part (1) connected to the flap shaft (4) out from the stamped insert part (1).

2. The method according to claim 1, wherein the planar region (2) is cut out from the stamped insert part (1) through the use of laser cutting.

3. The method according to claim 1, further comprising providing a weakened zone (16) in the shaped insert part (1), and cutting the planar region (2) out along the weakened zone (16).

4. The method according to claim 1, wherein at the same time as the stamped insert part (1) is molded into a housing material (17), the housing material (17, 31) is caused to penetrate into openings (8) in the insert border (7) of the stamped insert part (1).

5. The method according to claim 1, wherein when the fastening region (3) is molded-in with plastic material, the plastic material is caused to penetrate into openings (6, 13) in the planar region (2) of the stamped insert part (1) and the flap shaft (4).

6. The method according to claim 5, further comprising press fitting bearing bushes (19, 20) onto the flap shaft (4) after the fastening region (3) is molded-in with plastic material (18).

7. The method according to claim 6, further comprising providing recesses (9, 10) in the border (7), and press fitting the bearing bushes (19, 20) in the vicinity of recesses (9, 10).

8. The method according to claim 5, further comprising providing bracket-like punched parts (11, 12, 15) in the planar region (2) of the stamped insert part (1), and enclosing the bracket-like punched parts (11, 12, 15) with plastic when the fastening region (3) is molded in.

9. The method according to claim 4, wherein when the fastening region (3) is molded-in with plastic material, the plastic material is caused to penetrate into openings (6, 13) in the planar region (2) of the stamped insert part (1) and the flap shaft (4), and wherein the method further comprises providing openings (6) in the planar region (2) of the stamped insert part (1), and when the fastening region (3) is molded-in with plastic material (18), ribs (21) are formed, which penetrate through the openings (6).

10. The method according to claim 8, further comprising forming the bracket-like punched parts (11, 12, 15) spaced apart from one another in an alternating sequence on the top and bottom (33, 34) of the planar region (2) of the stamped insert part (1).

11. The method according to claim 8, further comprising forming interstices in the fastening region (3) between the bracket-like punched parts (11, 12, 15) of the stamped insert part (1), which interstices permit the plastic material (18) to flow through.

12. A throttle valve unit produced according to the method according to claim 1, the valve further comprising a weakened zone (16) in the stamped insert part (1), the weakened zone bordering the planar region (2) to be cut out and being embodied on one of the sides (33, 34) or on both sides (33, 34) of the stamped insert part (1).

13. The throttle valve unit according to claim 12, wherein the stamped insert part (1) comprises bracket-like punched parts (11, 12, 15), which encompass the flap shaft (4), and an insert border (7) provided with a number of openings (8).

14. The throttle valve unit according to claim 13, wherein the bracket-like punched parts (11, 12, 15) in the fastening region (3) of the stamped insert part (1) are embodied in alternating fashion on the top and bottom (33, 34).

15. The throttle valve unit according to claim 13, wherein the flap shaft (4) comprises openings (13) that pass all of the way through it, which openings are disposed in the fastening region (3), next to the bracket-like punched parts (11, 12) of the stamped insert part (1).

16. The throttle valve unit according to claim 13, wherein the openings (13) that pass all of the way through the flap shaft (4) in the fastening region (3) are covered by the bracket-like punched parts (15) in the planar region (2) of the stamped insert part (1).

* * * * *